US012702941B2

(12) United States Patent
Merrigan et al.

(10) Patent No.: US 12,702,941 B2
(45) Date of Patent: Aug. 11, 2026

(54) PRESSING SURFACE FOR FILTRATION CONTAINER ASSEMBLY

(71) Applicant: GRAYL INC., Seattle, WA (US)

(72) Inventors: Travis Merrigan, Bremerton, WA (US); Patrick Crosby, Terrell, NC (US); Scott Rolfson, Portland, OR (US); Christopher Leiter, Happy Valley, OR (US); Geneva Goldwood, Tacoma, WA (US)

(73) Assignee: GRAYL INC., Seattle, WA (US)

( * ) Notice: Subject to any disclaimer, the term of this patent is extended or adjusted under 35 U.S.C. 154(b) by 680 days.

(21) Appl. No.: 17/581,817

(22) Filed: Jan. 21, 2022

(65) Prior Publication Data

US 2023/0233964 A1 Jul. 27, 2023

(51) Int. Cl.
*B01D 33/01* (2006.01)
*A45F 3/16* (2006.01)
(Continued)

(52) U.S. Cl.
CPC ............ *B01D 33/0116* (2013.01); *A45F 3/18* (2013.01); *B01D 35/30* (2013.01); (Continued)

(58) Field of Classification Search
CPC ................ B01D 33/0116; B01D 35/30; B01D 2201/302; A45F 3/18; A45F 2003/163; (Continued)

(56) References Cited

U.S. PATENT DOCUMENTS 5,244,113 A * 9/1993 Stymiest ............ B65D 47/0885 215/396
D683,581 S 6/2013 Archer
(Continued)

FOREIGN PATENT DOCUMENTS

CN 303096729 2/2015
CN 104602783 5/2015
(Continued)

OTHER PUBLICATIONS

Camelbak Chute Mag 20oz Water Bottle, Insulated Stainless Steel, retreived from https://www.camelbak.com/recreation/shop/bottles/stainless-steel/chute-mag-20oz-water-bottle-insulated-stainless-steel/CB-1515.html on Jul. 29, 2022, 5 pages.
(Continued)

*Primary Examiner* — Liam Royce
(74) *Attorney, Agent, or Firm* — Polsinelli PC

(57) ABSTRACT

Embodiments are directed to filtration container assemblies and methods of using the same. A filtration container assembly includes an outer container and a plunging assembly. The plunging assembly includes an inner sleeve, a filtration assembly, and a cap assembly having a pressing surface. When the outer container is at least partially filled with liquid, a user can exert pressure on the pressing surface of the plunging assembly to nest the plunging assembly within the outer container, using positive pressure to displace the liquid in the outer container through the filtration assembly into the inner sleeve. In some embodiments, at least a portion of a handle for the filtration container assembly may be a part of the pressing surface.

24 Claims, 12 Drawing Sheets

(51) Int. Cl.

| | |
|---|---|
| ***A45F 3/18*** | (2006.01) |
| ***B01D 35/30*** | (2006.01) |
| ***B65D 21/02*** | (2006.01) |
| ***B65D 23/08*** | (2006.01) |
| ***B65D 23/10*** | (2006.01) |
| ***B65D 47/08*** | (2006.01) |
| ***B65D 47/12*** | (2006.01) |
| ***B65D 51/24*** | (2006.01) |
| ***C02F 1/00*** | (2023.01) |

(52) U.S. Cl.
CPC ..... *B65D 21/0233* (2013.01); *B65D 23/0885* (2013.01); *B65D 23/104* (2013.01); *B65D 47/0885* (2013.01); *B65D 47/123* (2013.01); *B65D 51/242* (2013.01); *C02F 1/002* (2013.01); *A45F 2003/163* (2013.01); *B01D 2201/302* (2013.01); *C02F 2307/02* (2013.01)

(58) Field of Classification Search
CPC ............ B65D 21/0233; B65D 23/0885; B65D 23/104; B65D 47/123; B65D 51/242; C02F 1/002; C02F 1/283; C02F 1/32; C02F 1/42; C02F 1/444; C02F 2307/02; C02F 2101/20; C02F 2201/004
See application file for complete search history.

(56) References Cited

U.S. PATENT DOCUMENTS

| | | | |
|---|---|---|---|
| D729,584 | S | 5/2015 | Weston et al. |
| D863,879 | S | 10/2019 | Merrigan et al. |
| D870,508 | S | 12/2019 | Palkon |
| 10,512,347 | B1 | 12/2019 | Shepard et al. |
| D878,866 | S | 3/2020 | Cheng |
| D884,418 | S | 5/2020 | Wang |
| D884,419 | S | 5/2020 | Backs |
| D886,517 | S | 6/2020 | Bo |
| D887,776 | S | 6/2020 | Bo |
| D889,199 | S | 7/2020 | Shepard et al. |
| D894,672 | S | 9/2020 | Huang |
| D895,352 | S | 9/2020 | Yao |
| D896,024 | S | 9/2020 | Wang et al. |
| D896,574 | S | 9/2020 | Wang et al. |
| D897,146 | S | 9/2020 | Lane et al. |
| D897,760 | S | 10/2020 | Feng |
| D900,537 | S | 11/2020 | Yao |
| D900,538 | S | 11/2020 | Yao |
| D903,403 | S | 12/2020 | Ames |
| D924,624 | S | 7/2021 | Huang |
| D925,279 | S | 7/2021 | Wang |
| 2014/0008310 | A1 | 1/2014 | Weston et al. |
| 2014/0008311 | A1 | 1/2014 | Weston et al. |
| 2014/0197082 | A1 | 7/2014 | Weston et al. |
| 2017/0107023 | A1 | 4/2017 | Miksovsky et al. |
| 2019/0135506 | A1 | 5/2019 | Merrigan et al. |
| 2020/0282344 | A1 | 9/2020 | Merrigan et al. |
| 2020/0338480 | A1 | 10/2020 | Weston et al. |
| 2022/0143532 | A1 | 5/2022 | Weston et al. |

FOREIGN PATENT DOCUMENTS

| | | |
|---|---|---|
| CN | 303263026 | 7/2015 |
| CN | 306898684 | 10/2021 |
| CN | 306898686 | 10/2021 |
| KR | 300503134.0000 | 8/2008 |
| WO | 2014004559 | 1/2014 |
| WO | 2014113601 | 7/2014 |
| WO | 2020185520 | 9/2020 |

OTHER PUBLICATIONS

Cheetah Bottle Cap, May 31, 2019, https://www.amazon.com/Cheetah-Bottles-Replacement-Accessories-Wide-Mouth/dp/B07SHD3VMD (Year: 2019).

Iron "Flask Bottle Cap", Apr. 1, 2021, https://www.amazon.com/Spout-:id-Wide-Moutn-Graphite/dp/B091HYD9KY (Year: 2021).

Grayl GeoPress Water Bottle Cap, Apr. 4, 2019, https://GRAYL-GeoPress-Water-Purifier-Bottle/dp/B08TTXBHRW (Year:2019).

Takeya Bottle Cap, May 19, 2016, https://www.amazon.com/Takeya-Originals-0Bottle-Spout-Steel/dp/B01FVW3FKI (Year: 2016).

Aquatix Bottle Cap, Jul. 15, 2016, https://www.amazon.com/Aquatix-ounce-FlipTop-Bottle-Cap/dp/B0711BJR8D (Year: 2016).

Eiposau Bottle Cap, Nov. 6, 2021, https://www.amazon.com/QIMUKKX-Simple-Modern-Takeya-Replacement/dp/B09L63XXKC (Year: 2021).

* cited by examiner 118
214
226
216
114
110
220
234
228
236
212
218
226
228
224
210

120
240
116
230
112
146
238
224
148

416
420
400
410
462

464
460
402
466

PRESSING SURFACE FOR FILTRATION CONTAINER ASSEMBLY

BACKGROUND

Some people prefer to filter tap water to remove unwanted impurities, tastes, heavy metals, and other toxins. Moreover, when collecting water from a natural, untreated source, such as a lake or a stream, or when traveling in a foreign country that does not treat its tap water, it is important to either filter or treat water for microbial contamination.

Tap water is currently filtered using several different kinds of filtering systems, for example, faucet attachments, refrigerator filter systems, or pitcher or basin-type drip filtration system, from which a user may pour filtered water from the filter systems into his or her cup. Natural, untreated water is typically filtered using a hand-held, filter pump that typically uses vacuum pressure to draw water into the filter. Improved filter assemblies using positive pressure are desirable because drip filtering processes can take a long time and vacuum filtering processes can be hard work for the user.

Positive pressure coffee and tea presses having a single container generally include a plunger received in an outer container. The plunger typically includes a screen filter mounted at the end of a shaft. Hot water is mixed with coffee grounds in the container, and the shaft is pressed down by the user into the container. As the shaft is pressed down, the screen filter presses the coffee grounds to the bottom of the container, while allowing the filtered coffee to pass through the screen to the top of the container. Depending on the tightness of the fit of the screen filter in the container, some grounds may pass to the filtered coffee around the outer perimeter of the screen filter, resulting in undesirable coffee grounds in the user's coffee. Because of the likeliness of contamination in the filtered coffee, a "coffee-press" type water filter is not a good design for water filtration.

Therefore, there exists a need for an improved positive-pressure filter assembly that can improve the experience for a user in filtering water, coffee, and other liquids. There also exists a need for other improvements in container assemblies, such as improved cap assemblies.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment of the present disclosure, a filtration container assembly is provided. The assembly includes: an outer container having a first open end and a second closed end and defining an inner cavity; and a plunging assembly having a first end and a second end, wherein the second end of the plunging assembly is configured to be received within the inner cavity of the outer container, and wherein the first end of the plunging assembly includes a cap having a first surface, the first surface configured to define a continuous surface having an area of at least 60% of the cross-sectional area of the outer container.

In another embodiment of the present disclosure, a method of filtering a liquid using a filtration container assembly is provided. The method includes: obtaining a filtration container assembly including an outer container having a first open end and a second closed end and defining an inner cavity, and a plunging assembly having a first end and a second end, wherein the second end of the plunging assembly is configured to be received within the inner cavity of the outer container, and wherein the first end of the plunging assembly includes a cap having a first pressing surface configured for a user to press the plunging assembly into the inner cavity of the outer container, wherein the pressing surface defines a substantially continuous surface having an area of at least 60% of the cross-sectional area of the outer container; filling the outer container with a liquid to equal to or less than a fill indicator; inserting the second end of the plunging assembly into the first open end of the outer container; and pressing the first pressing surface of the plunging assembly to press the plunging assembly into the inner cavity of the outer container.

In another embodiment of the present disclosure, a filtration container assembly is provided. The assembly includes an outer container having a first open end and a second closed end and defining an inner cavity; and a plunging assembly having a first end and a second end, wherein the second end of the plunging assembly is configured to be received within the inner cavity of the outer container, and wherein the first end of the plunging assembly includes a cap having a pivoting handle, the cap and at least a portion of the handle together defining a first pressing surface configured for a user to press the plunging assembly into the inner cavity of the outer container.

In another embodiment of the present disclosure, a method of filtering a liquid using a filtration container assembly. The method includes: obtaining a filtration container assembly including an outer container having a first open end and a second closed end and defining an inner cavity, and a plunging assembly having a first end and a second end, wherein the second end of the plunging assembly is configured to be received within the inner cavity of the outer container, and wherein the first end of the plunging assembly includes a cap having a pivoting handle, the cap and the handle together defining a first pressing surface configured for a user to press the plunging assembly into the inner cavity of the outer container; filling the outer container with a liquid to equal to or less than a fill indicator; inserting the second end of the plunging assembly into the first open end of the outer container; and pressing the first pressing surface of the plunging assembly to press the plunging assembly into the inner cavity of the outer container.

In any of the embodiments described herein, the plunging assembly may include an inner sleeve having a first end and a second end and an outer wall defining an inner bore.

In any of the embodiments described herein, the outer wall may be continuous from the first end to the second end of the inner sleeve.

In any of the embodiments described herein, the plunging assembly may include a filtration assembly having a first end and a second end, wherein the first end of the filtration assembly is at or near the second end of the inner sleeve.

In any of the embodiments described herein, the first end of the filtration assembly may be mechanically coupled to the inner sleeve at or near the second end of the inner sleeve.

In any of the embodiments described herein, the second end of the filtration assembly may be outside the inner bore of the inner sleeve.

In any of the embodiments described herein, the filtration container assembly may further include a device for releasing pressure from the inner cavity of the outer container when the plunging assembly is received within the inner cavity of the outer container.

In any of the embodiments described herein, the plunging assembly may be configured to filter a liquid contained in the outer container as the plunging assembly is pressed into the inner cavity of the outer container and the liquid moves from the inner cavity of the outer container through the filtration assembly to the inner bore of the inner sleeve of the plunging assembly.

In any of the embodiments described herein, the cap may be removable from the plunging assembly.

In any of the embodiments described herein, the cap may include an access port to the inner bore of the inner sleeve.

In any of the embodiments described herein, the cap may include a pivoting handle attached thereto.

In any of the embodiments described herein, the first surface of the cap may be a first pressing surface of the filtration container assembly.

In any of the embodiments described herein, the first pressing surface may allow for a compression force to be applied to the filtration container assembly along the longitudinal axis of the outer container to press the plunging assembly into the inner cavity of the outer container.

In any of the embodiments described herein, at least a portion of the first pressing surface may be substantially planar.

In any of the embodiments described herein, the outer surface of the second closed end of the outer container may define a second pressing surface of the filtration container assembly.

In any of the embodiments described herein, at least a portion of the second pressing surface may be substantially planar.

In any of the embodiments described herein, the first surface may define a substantially planar and continuous surface having an area of at least 70% of the cross-sectional area of the outer container or of at least 80% of the cross-sectional area of the outer container.

In any of the embodiments described herein, the assembly may further include retractable handles and/or a bumper cup.

In any of the embodiments described herein, pressing the first pressing surface may include using at least on hand to move the plunging assembly into the first open end of the outer container in a direction along the longitudinal axis of the outer container.

In any of the embodiments described herein, pressing the first pressing surface of the plunging assembly into the inner cavity of the outer container may cause liquid in the inner cavity of the outer container to be filtered.

In any of the embodiments described herein, the handle may be configured for pivoting movement between a first position and a second position.

In any of the embodiments described herein, the first position may be a retracted position.

In any of the embodiments described herein, the handle may be in the retracted position when is part of the first pressing surface.

In any of the embodiments described herein, the cap may include a cap body having a first end and a second end defining a cap body height.

In any of the embodiments described herein, the handle may have a handle body defining a holding portion and a first arm and a second arm, each of the first and second arms pivotably coupled to the cap body, and the handle arms may each have a first side and a second side defining a handle arm width.

In any of the embodiments described herein, the handle arm width may be less than or equal to the cap body height.

In any of the embodiments described herein, the cap body may include first and second lip portions disposed between the first and second ends of the cap body, the first and second lip portions configured to support the second side of each of the first and second handle arms when the handle is in the retracted position.

In any of the embodiments described herein, the first side of each of the first and second handle arms may define a portion of the first pressing surface.

In any of the embodiments described herein, the holding portion of the handle body may have a first side and a second side defining a holding portion width.

In any of the embodiments described herein, the first side of the holding portion may define a portion of the first pressing surface.

BRIEF DESCRIPTION OF THE SEVERAL VIEWS OF THE DRAWINGS

The foregoing aspects and many of the attendant advantages of this disclosure will become more readily appreciated as the same become better understood by reference to the following detailed description, when taken in conjunction with the accompanying drawings. To easily identify the discussion of any particular element or act, the most significant digit or digits in a reference number refer to the figure number in which that element is first introduced.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, to achieve the same or substantially similar result.

In the following description, numerous specific details are set forth to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1A:
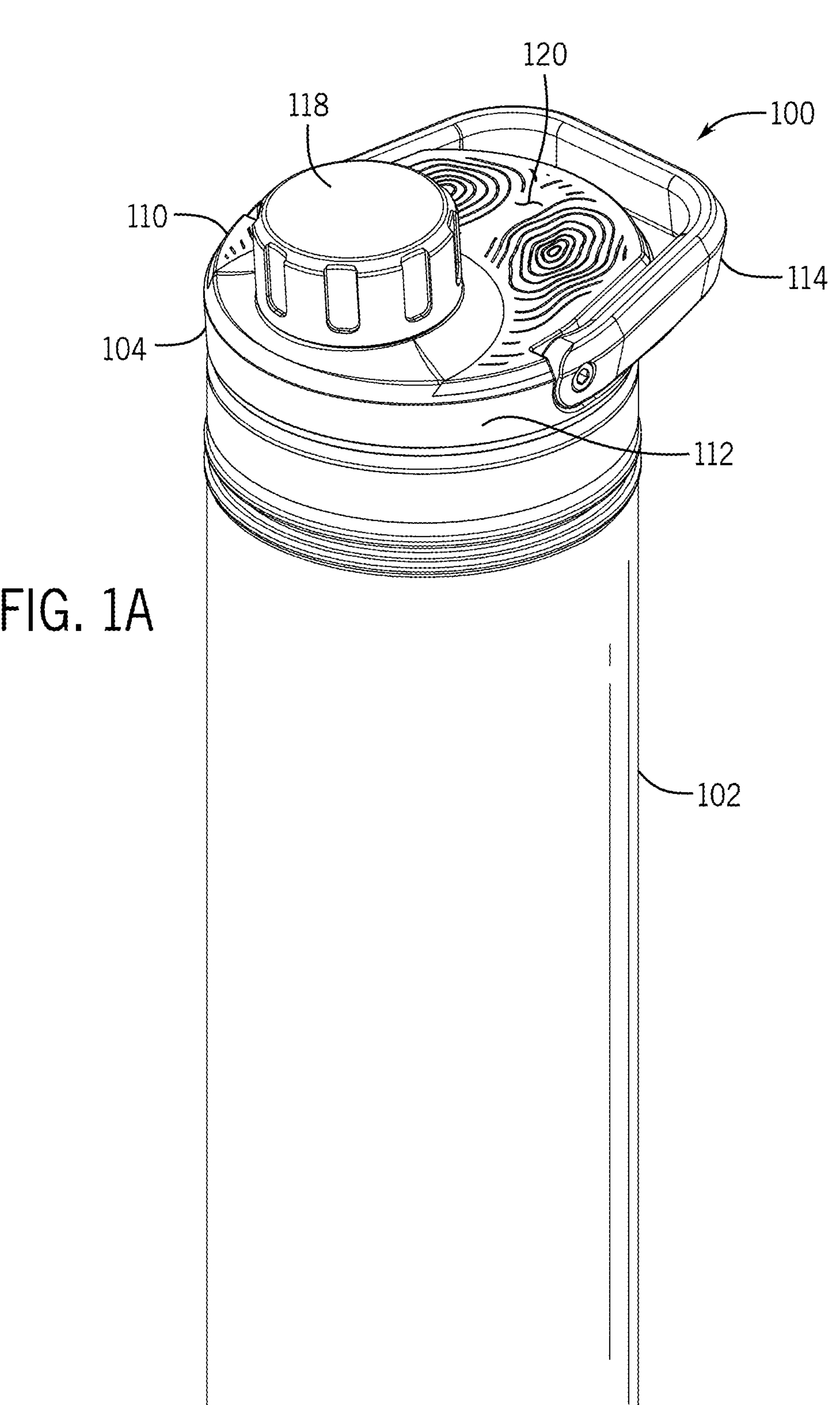
FIG. 1A illustrates an isometric view of a filtration container assembly in accordance with one embodiment of the present disclosure.

Embodiments of the present disclosure are generally directed to filtration container assemblies and methods of use therefor. In the illustrated embodiment of FIGS. 1A-1C, a filtration container assembly 100 generally includes an outer container 102 and a plunging assembly 104, which includes an inner sleeve 106 and a filtration assembly 108. The plunging assembly 104 may further include a cap assembly 110. As described in greater detail below in accordance with embodiments of the present disclosure, when the outer container 102 is at least partially filled with liquid, the user can exert pressure on the plunging assembly 104 to nest the plunging assembly 104 within the outer container 102, using positive pressure to displace the liquid in the outer container 102 through the filtration assembly 108 into the inner sleeve 106.

Although shown and described as a personal water filtration container assembly, it should be appreciated that other embodiments are within the scope of the present disclosure. For example, a filtration container assembly within the scope of the present disclosure may be configured as a large container, such as a jug, cooler, barrel, or tank, or as a smaller container, such as a bottle or sippy cup. It should be appreciated that larger form factors may use a crank or even an electric motor to achieve the positive pressure value required for filtration.

Moreover, coffee or tea presses having an inner sleeve and outer container, but which include screen or sieve filters instead of particulate and microbial filters, are within the scope of the present disclosure. In accordance with embodiments of the present disclosure, suitable filters for use in the filtration container assemblies, include, but are not limited to screens, sieve fillers, granular-activated carbon filters, metallic alloy filters, microporous ceramic filters, a carbon block resin filters, electrostatic nanofiber filters, reverse osmosis filters, ion exchange filters, UV light filters, hollow fiber membrane filters, and ultra-filtration membrane filters.

Any directional references in the present application, such as “up”, “down”, “top”, “bottom”, etc., are intended to describe the embodiments of the present disclosure with reference to the orientations provided in the figures and are not intended to be limiting. The term “substantially” is used herein to include standard engineering and/or manufacturing tolerances.

Figure 1B:
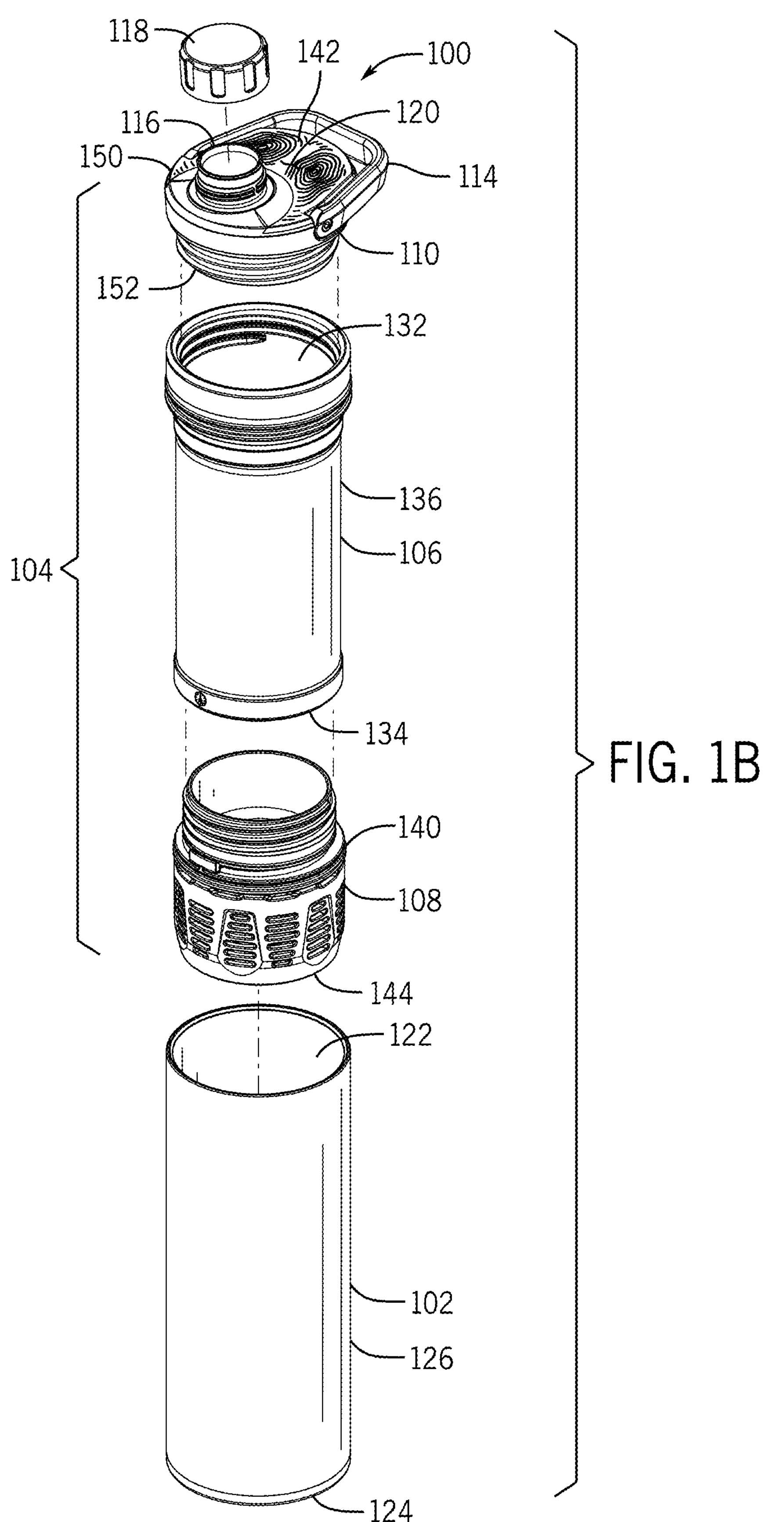
FIG. 1B illustrates a top exploded view of the filtration container assembly of FIG. 1A.
Figure 1C:
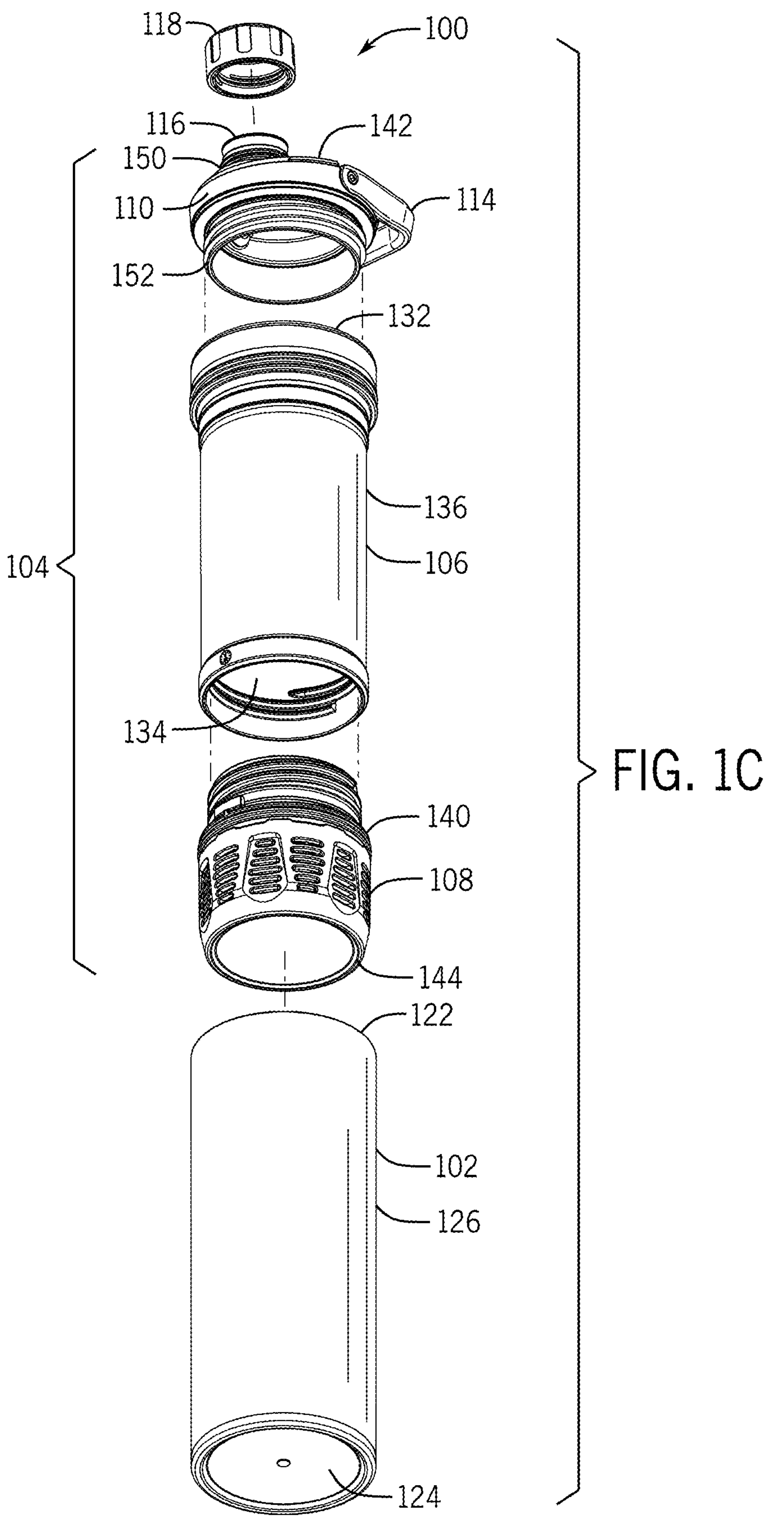
FIG. 1C illustrates a bottom exploded view of the filtration container assembly of FIG. 1A.

Referring to FIGS. 1B and 1C, the outer container 102 will now be described. In the illustrated embodiment, the outer container 102 is a substantially cylindrical cup having a wall 126 extending between a first open end 122 and a second closed end 124 and defining an inner cavity 128. Although shown in the illustrated embodiment as having a substantially cylindrical wall 126 on both inner and outer surfaces, it should be appreciated that other cross-sectional shapes are also within the scope of the present disclosure. For example, the outer container 102 may have a substantially cylindrical inner cavity 128, but a non-cylindrical outer surface. As described in greater detail below, a substantially cylindrical inner cavity 128 is designed and configured to mate with a plunging assembly 104 in accordance with one embodiment of the present disclosure.

The outer container 102 is configured to receive liquid, for example, unpurified or unfiltered tap or water from a natural, untreated source. In that regard, when in use, the outer container 102 may be filled or at least partially filled with liquid. The outer container 102 may be made from any suitable materials designed for holding liquid, for example, suitable plastic and/or metal materials.

Still referring to FIGS. 1B and 1C, the plunging assembly 104 will now be described. As mentioned above, the plunging assembly 104 includes the inner sleeve 106 and the filtration assembly 108, both of which are designed to be received within the inner cavity 128 of the outer container 102. In the illustrated embodiment, the inner sleeve 106 has a wall 136 extending between a first open end 132 and a second open end 134 and defining an inner bore 138 therethrough. Therefore, the inner sleeve 106 has a continuous sidewall to prevent the migration of contaminants into the filtered liquid that is stored in the inner sleeve 106.

In the illustrated embodiment, the filtration assembly 108 has a first end 146 and a second end 148, with the first end 146 of the filtration assembly 108 disposed at or near the second open end 134 of the inner sleeve 106 and the second end 148 of the filtration assembly 108 defining the second end 144 of the plunging assembly 104. The first end 146 of the filtration assembly 108 may be mechanically coupled to the inner sleeve 106 at or near the second open end 134 of the inner sleeve 106. In the illustrated embodiment, the first end 146 of the filtration assembly 108 and the second end 134 of the inner sleeve 106 include reciprocal threads for a screw interface. However, other suitable interfaces are also within the scope of the present disclosure.

In the illustrated embodiment, the filtration assembly 108 is disposed outside the inner bore 138 of the inner sleeve 106. However, in some embodiments, the filtrations assembly 108 may be all or partly disposed within the inner bore 138 of the inner sleeve 106.

The plunging assembly 104 is configured to move like a piston relative to outer container 102, and therefore, is designed to be received within the outer container 102. Although not required, the inner sleeve 106 may have a substantially consistent cross-sectional area and/or shape along the length of inner sleeve 106. Although shown as a substantially cylindrical outer container 102, it should be appreciated that the outer container 102 may be configured to have any cross-sectional shape, so long as the inner cavity 128 of the outer container 102 and the outer wall 136 of the inner sleeve 106 are capable of nesting together. In one embodiment of the present disclosure, the inner sleeve 106 and filtration assembly 108 when nested are wholly contained within the inner cavity 128 of the outer container 102. In the illustrated embodiment, the inner cavity 128 of the outer container 102 is substantially cylindrical, and the second end 144 (the plunging end) of the plunging assembly 104 is configured to form a seal with the inner cavity 128 of the outer container 102 through the piston movement of the plunging assembly 104 (compare FIGS. 3A-3D).

The plunging assembly 104 of the illustrated embodiment further includes a cap assembly 110 at its first end 142 (the gripping end) of the plunging assembly 104. Referring to FIGS. 1A-1C and FIGS. 2A-2C, the cap assembly 110 includes a body portion 112, an optional handle 114, and an access port or spout 116. The access port or spout 116 provides access to the inner bore 138 of the inner sleeve 106, for example, for a user to drink from or to pour from. In the illustrated embodiment, the spout 116 includes a spout cap 118.

The body portion 112 of the cap assembly 110 has a first end 150 and a second end 152 defining a cap body height. In the illustrated embodiment, the spout 116 is located at the first end 150 of the cap assembly 110, and the second end 152 of the cap assembly 110 is configured for interfacing with the first end 132 of the inner sleeve 106. In the illustrated embodiment, the cap assembly 110 and the first end 132 of the inner sleeve 106 include reciprocal threads for a screw interface. However, other suitable interfaces are also within the scope of the present disclosure.

The body portion 112 further defines a pressing surface 120 (see FIG. 1A) that can be used to press the plunging assembly 104 into the outer container 102. The pressing surface 120 allows for a compression force to be applied by a user to press the plunging assembly 104 into the inner cavity 128 of the outer container 102 along a longitudinal axis of the outer container 102. The second closed end 124 of the outer container 102 defines a second pressing surface upon which the compression force can the applied. For example, the second closed end 124 may be held by the user of positioned on a surface when the user presses on the first pressing surface 120. The body portion 112 or the handle 114 of the cap assembly 110 can be used to withdraw the plunging assembly 104 from the outer container 102.

Figure 2A:
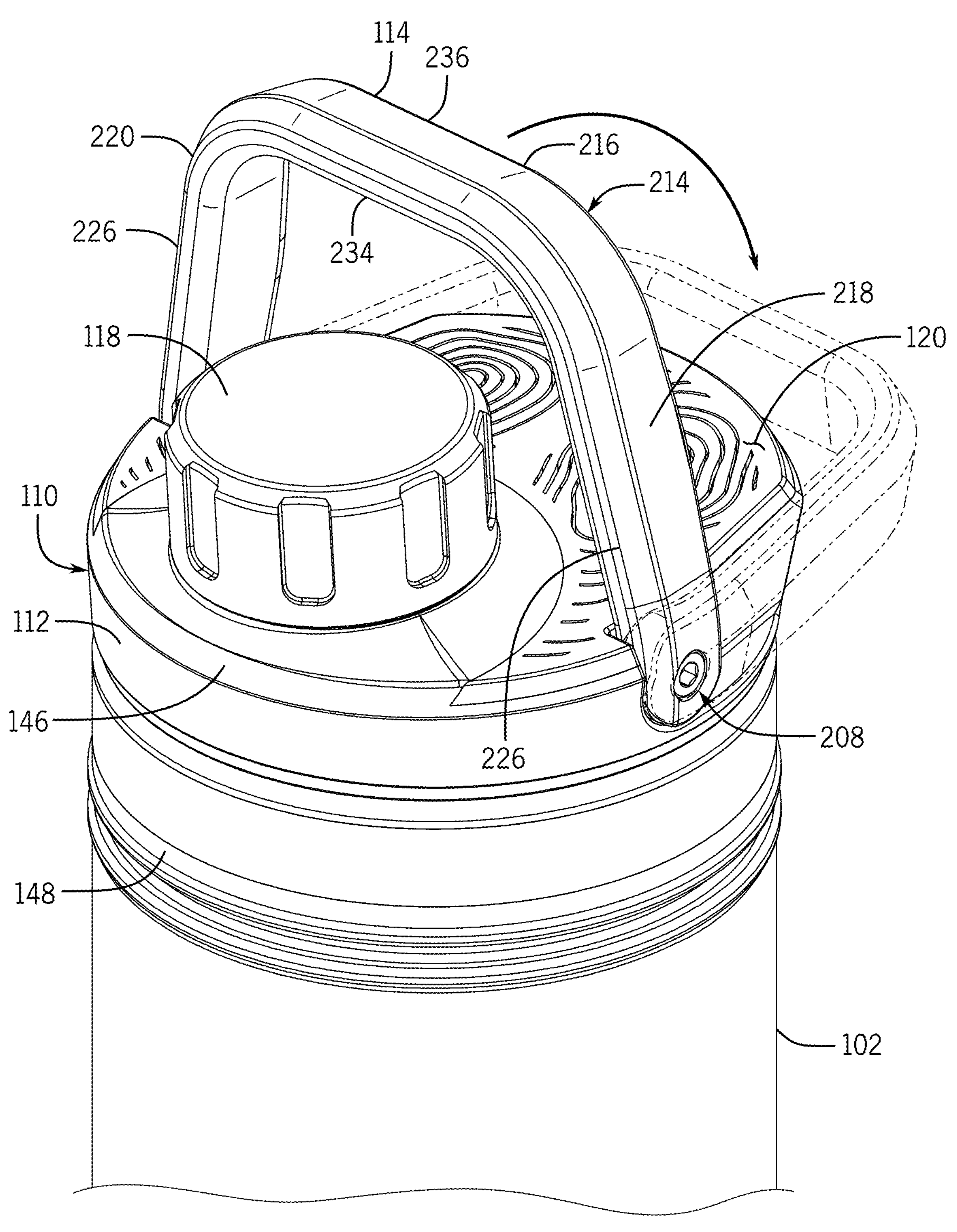
FIG. 2A illustrates a top isometric view of a cap assembly of the filtration container assembly of FIG. 1A (with a handle in its extended position, but in phantom showing movement to a retracted position).
Figure 2B:
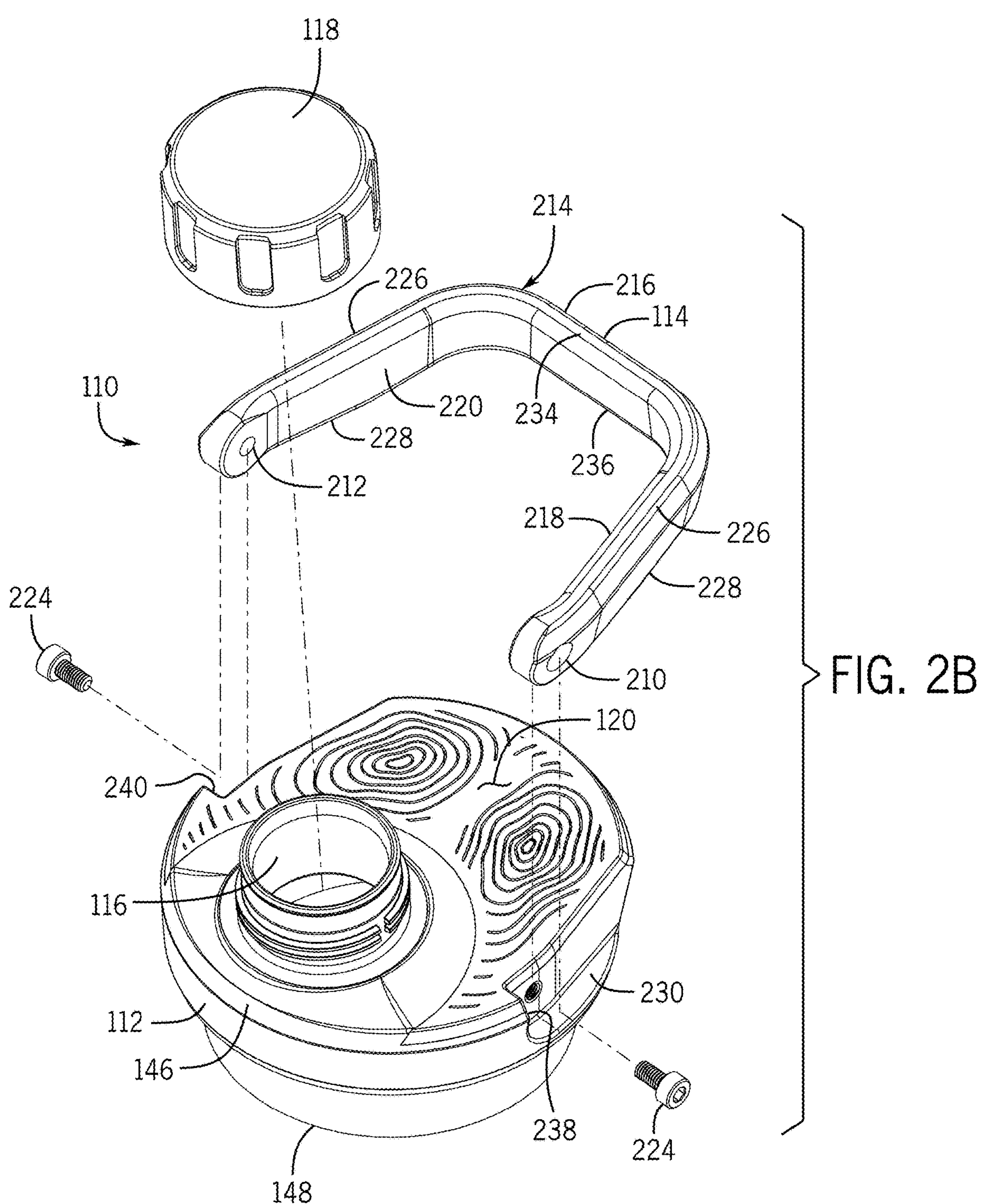
FIG. 2B illustrates an exploded view of the cap assembly of FIG. 2A.
Figure 2C:
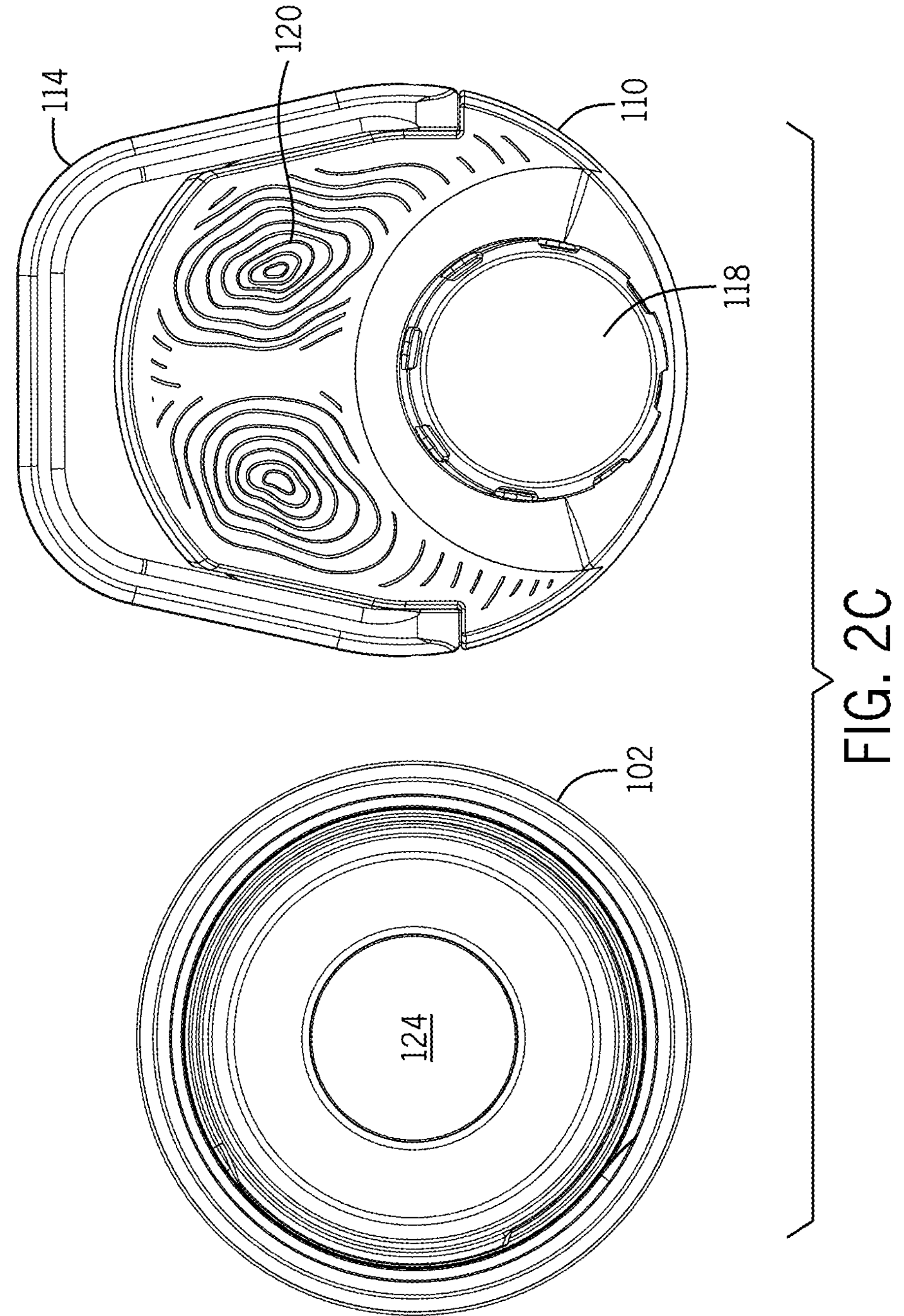
FIG. 2C illustrates comparative top views of the cap assembly of FIG. 2A and the outer container of the filtration container assembly of FIGS. 1A-1C.

As seen in FIG. 2C, the pressing surface 120 on the cap assembly 110 defines a continuous surface having an area of at least 60% of the cross-sectional area of the outer container 102. The pressing surface 120 may be a substantially planar surface. In some embodiments, the pressing surface 120 may be a substantially planar and continuous surface having an area of at least 70% of the cross-sectional area of the outer container 102. In some embodiments, the pressing surface 120 may be a substantially planar and continuous surface having an area of at least 80% of the cross-sectional area of the outer container 102. As described in greater detail below, the handle 114 may define a portion of the pressing surface.

As seen in FIGS. 2A and 2B, the handle 114 may be a pivoting handle having a pivoting assembly 208 including first and second pivoting handle attachments 210 and 212 on first and second sides of the body portion 112. The pivoting handle 114 of the illustrated embodiment moves between an extended position (see solid lines in FIG. 2A), and a retracted position (see phantom lines in FIG. 2A).

The handle 114 has a handle body 214 defining a holding portion 216 and a first arm 218 and a second arm 220. Each of the first and second arms 218 and 220 are pivotably coupled to the cap body portion 112, for example, by attachment devices, shown as fasteners 222 and 224. The handle first and second arms 218 and 220 each have a first side 226 and a second side 228 defining a handle arm width. The handle arm width is less than or equal to the cap body height.

The cap body portion 112 includes a first stop. In the illustrated embodiment, the first stop is defined by first and second lip portions 230 and 232 disposed between the first and send ends 148 and 148 of the cap body portion 112. The first and second lip portions 230 and 232 are configured to stop and support the second sides 228 of each of the first and second handle arms 218 and 220 when the handle 114 is in the retracted position.

In addition, the holding portion 216 of the handle 114 has a first side 234 and a second side 236 defining a holding portion width. The holding portion 216 may be designed and configured such that the first side 234 of the holding portion 216 and the first sides 226 of the first and second handle arms 218 and 220 create a substantially planar surface.

When the handle 114 is in the extended position, it can be used for carrying the filtration container assembly 100 or for pulling the plunging assembly 104 from the outer container 102. As seen in the illustrated embodiment of FIG. 2A, the cap body portion 112 may include a second stop, shown as surfaces 238 and 240, to interact with the first sides 226 of arms 218 and 220 to prevent the handle 114 from over-rotating beyond a predetermined angle, for example, a 90-degree or near 90-degree position, so as not to interfere with the spout 116.

When the handle 114 is in the retracted position, the pressing surface 120 of the cap body portion 112 and the second sides 228 of the handle arms 218 and 220 rest on the respective lip portions 230 and 232 of the cap body portion 112. The first sides 226 of the handle arms 218 and 220 can be used together define an enhanced (larger) pressing surface configured for a user to press the plunging assembly 104 into the inner cavity 128 of the outer container 102. In addition, the first side 234 of the handle holding portion 216 may also form part of the enhanced (larger) pressing surface configured for a user to press the plunging assembly 104 into the inner cavity 128 of the outer container 102. A large pressing surface 120 allows for ease of use for the user.

Although the first stop is illustrated as first and second lip portions 230 and 232 disposed between the first and send ends 146 and 148 of the cap body portion 112, the first stop may be designed and configured in other ways to provide support for the handle 114 so that the handle may be used as part of the pressing surface. For example, the first stop may be positioned on the outer container to provide support for the handle 114. In addition, for example, the first stop may provide support to the handle holding portion 216—either in addition to or in lieu of—the handle arms 218 and 220.

Use of the filtration container assembly 100 will now be described, in greater detail with reference to FIGS. 3A-3D. As can be seen in FIGS. 3A-3D, the outer container 102 and the plunging assembly 104 are capable of nesting with one another. In that regard, the second end 144 of the plunging assembly 104 seats at the bottom of the inner cavity 128 of the outer container 102, with a sealing device 140 forming a seal with the inner wall 126 of the outer container 102. Optional guides structures may extend from the outer wall 136 of the inner sleeve 106, from the filtration assembly 108, or from the inner wall 126 of the outer container 102 to provide suitable spacing between the plunging assembly 104 and the outer container 102. A collar assembly may be included at the interface between the first end 122 of the outer container 102 and the first end 132 of the inner sleeve 106 to engage the outer container 102 and the plunging assembly 104 and to optionally form a seal therebetween, for example, to prevent liquid spillage.

Figure 3A:
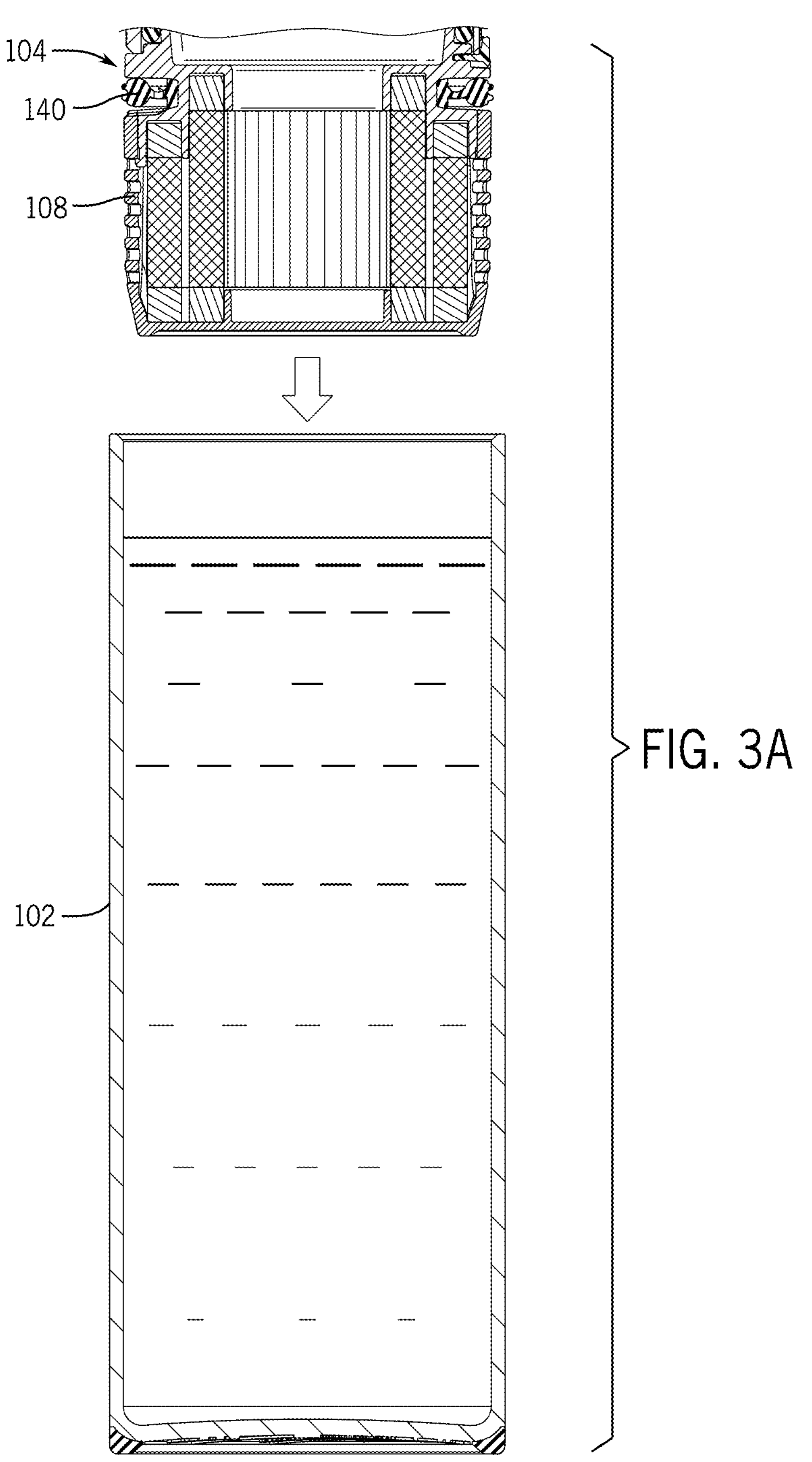
FIG. 3A-3D illustrate use of a filtration container assembly in accordance with embodiments of the present disclosure.
Figure 3B:
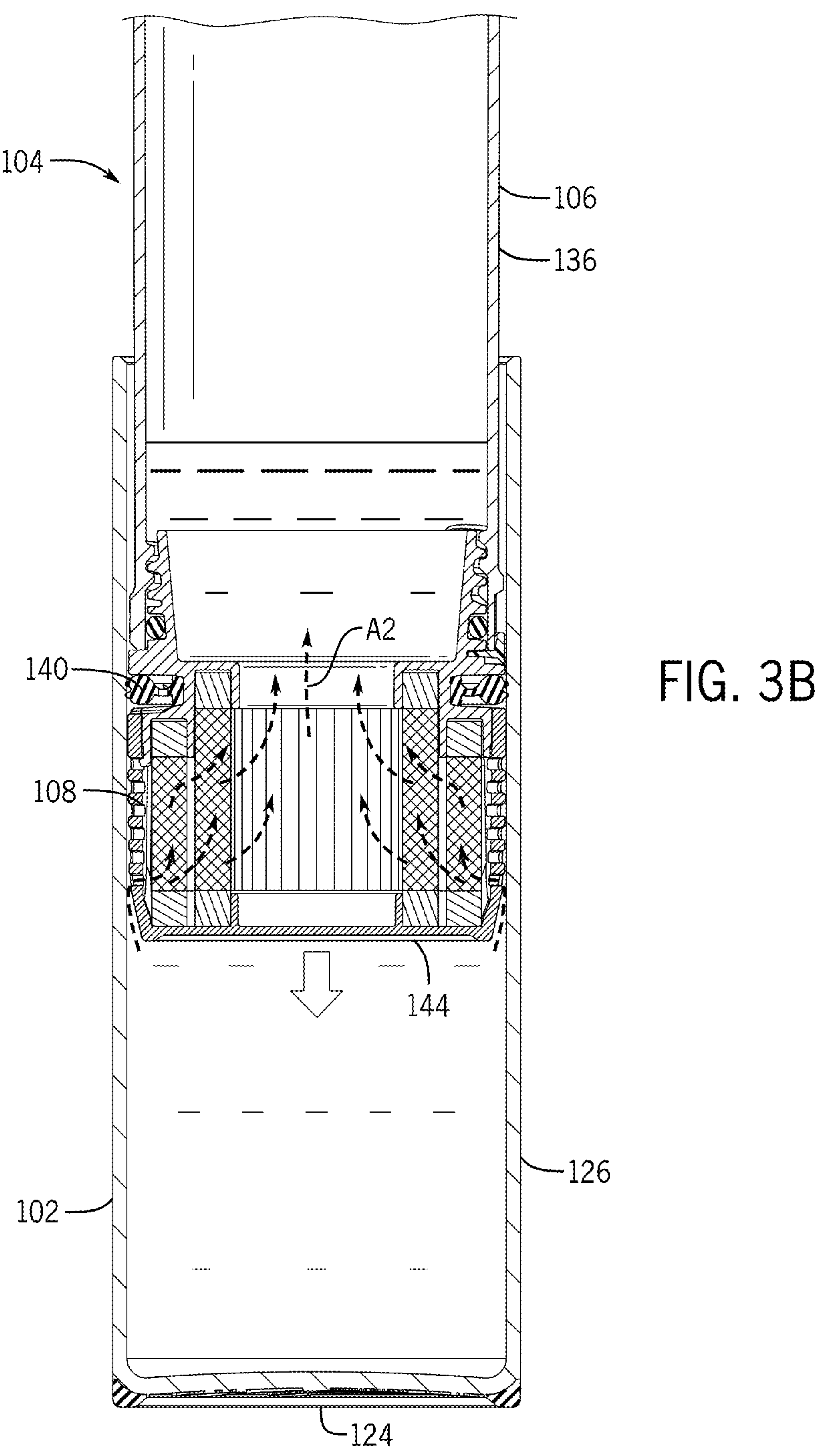
Figure 3C:
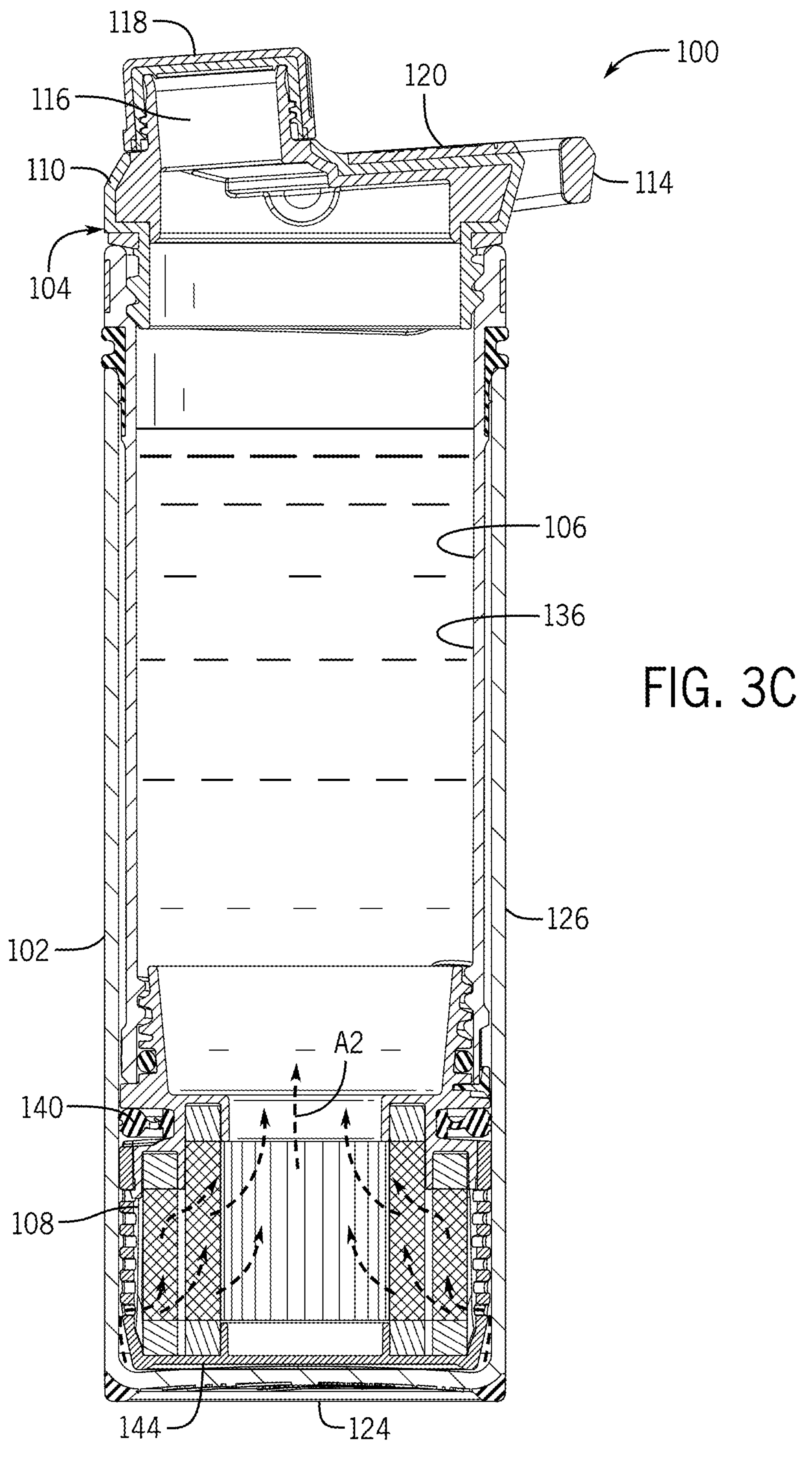

Referring to FIG. 3A, when the plunging assembly 104 is removed from the outer container 102, the outer container 102 can be filled with liquid. Referring to FIGS. 3B and 3C, as the plunging assembly 104 is pressed by the user into the outer container 102, it filters liquid (such as water) from the outer container 102 as it passes through the filtration assembly 108 into the inner sleeve 106. The filtered liquid is then stored in the inner sleeve 106.

Referring to FIG. 3C, when the plunging assembly 104 is fully inserted in the outer container 102, the plunging assembly 104 in nested within the outer container 102.

Figure 3D:
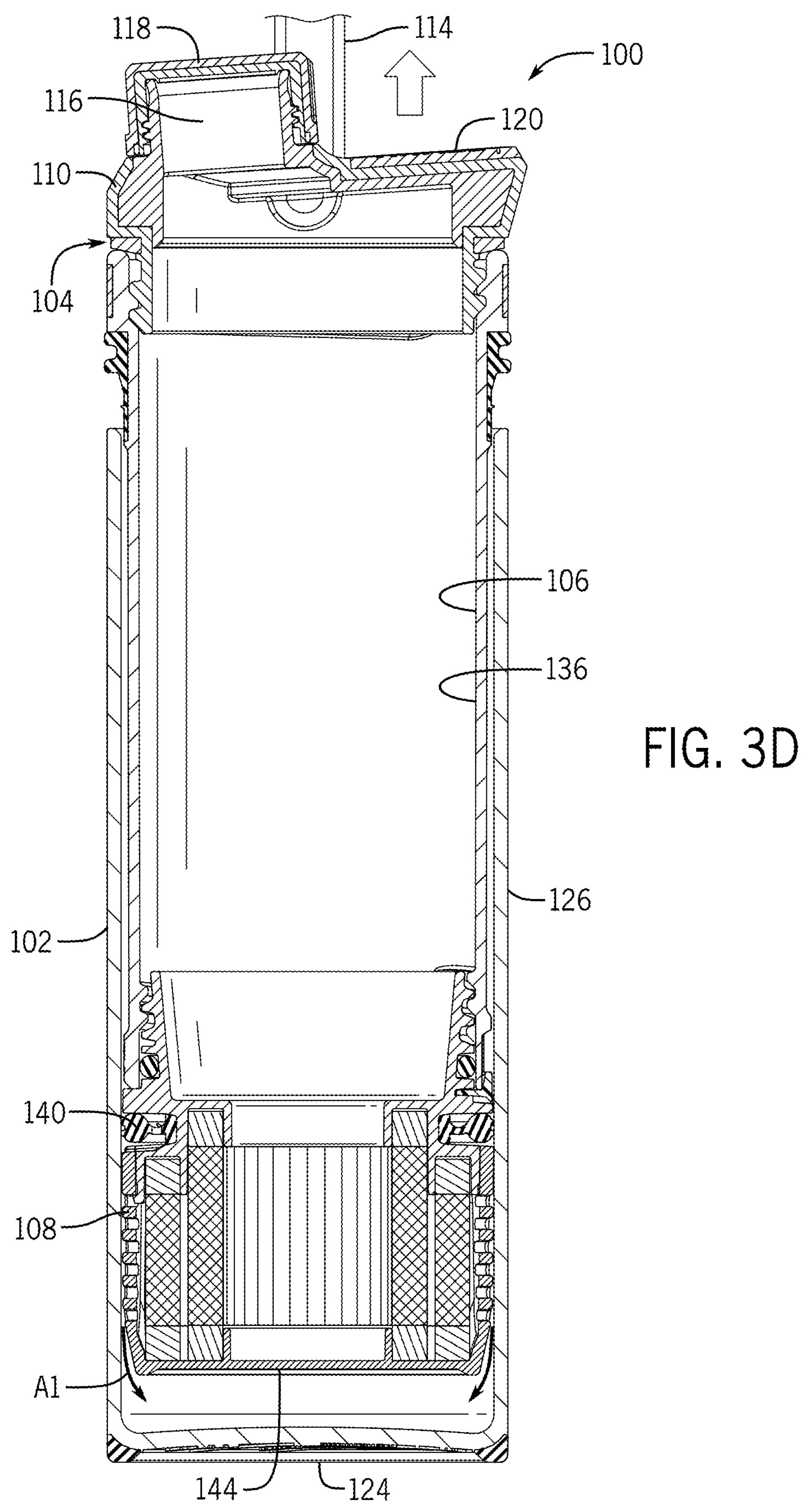

Referring to FIG. 3D, after the water has been removed from the inner sleeve 106, the plunging assembly 104 may be removed from the outer container 102 so that the outer container 102 can be refilled and reused for filtering. To release the plunging assembly 104 from the outer container 102, the user simultaneously grasps the outer container 102 with one hand and the plunging assembly 104 with the other hand, releasing the coupling of the plunging assembly 104 and the outer container 102.

As can be seen in comparing FIGS. 3A and 3D, the sealing device 140 is a "floating" seal, which means it is capable of movement between first and second "up" and "down" positions. In FIG. 3D, as the plunging assembly 104 is released from the outer container 102, the sealing device 140 of the filtration assembly 108 moves to the "down" position, creating a pathway for air or liquid to release the pressure in the outer container 102, as shown by the arrows A1.

Referring now to FIG. 3A, with the plunging assembly 104 removed from the outer container 102, the outer container 102 can be filled with liquid. Referring now to FIG. 3B, after the outer container 102 has been filled, with liquid, the plunging assembly 104 can be reinserted into the outer container 102 to filter the liquid and store it in the inner bore 138 of the inner sleeve 106. As can be seen in FIG. 3B, when filtering, the sealing mechanism 140 of the filtration assembly 108 moves to the "up" position, creating a seal between the outer container 102 and the inner sleeve 106, forcing all water in the outer container 102 through the filtration assembly 108 and into the inner bore 138 of the inner sleeve 106, as shown by the arrows A2.

Although the filtration container assembly of the present disclosure is shown and described as using a floating seal for pressure release, it should be appreciated that other methods of pressure release are also within the scope of the present disclosure.

Figure 4A:
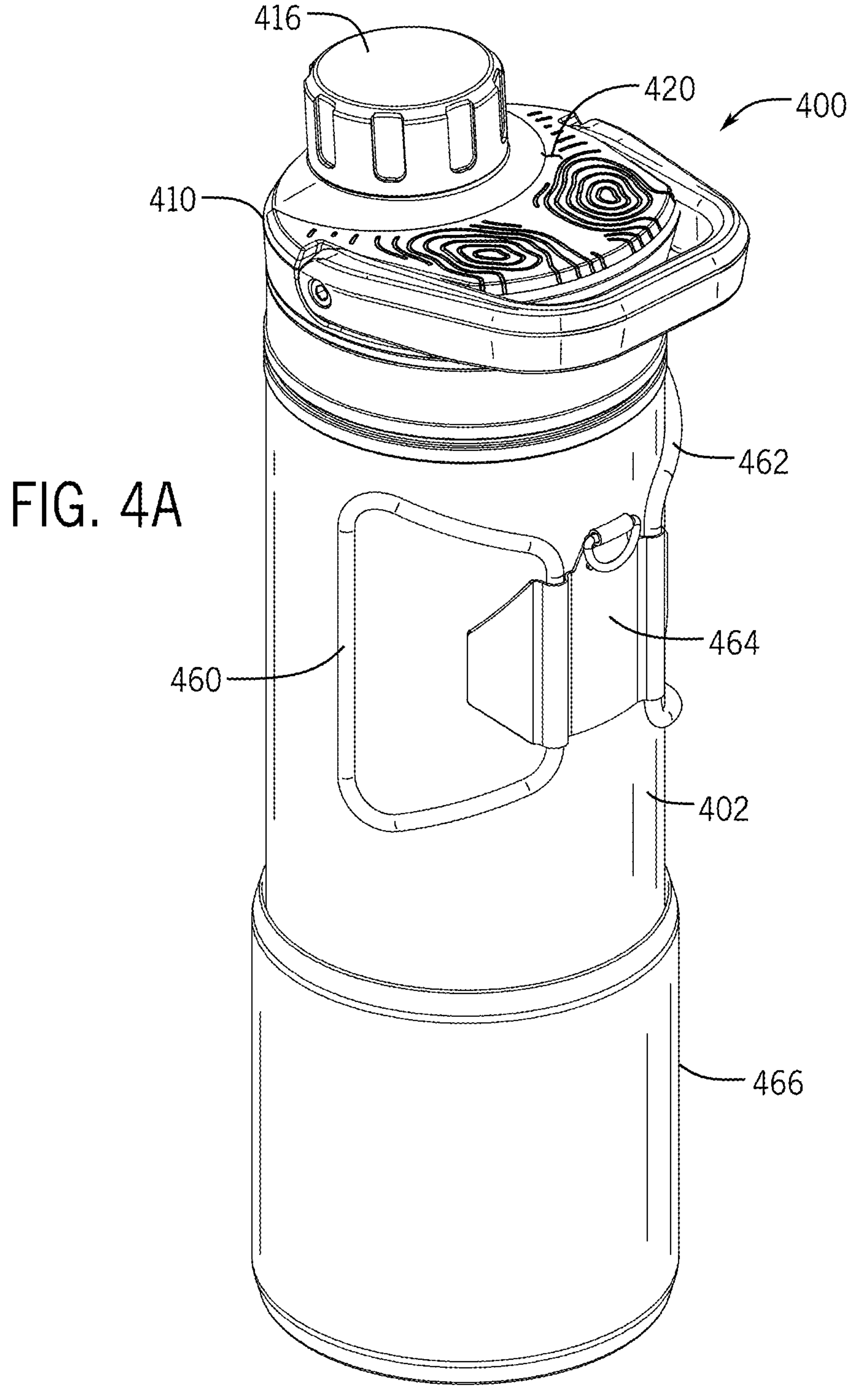
FIG. 4A illustrates another embodiment of a filtration container assembly.
Figure 4B:
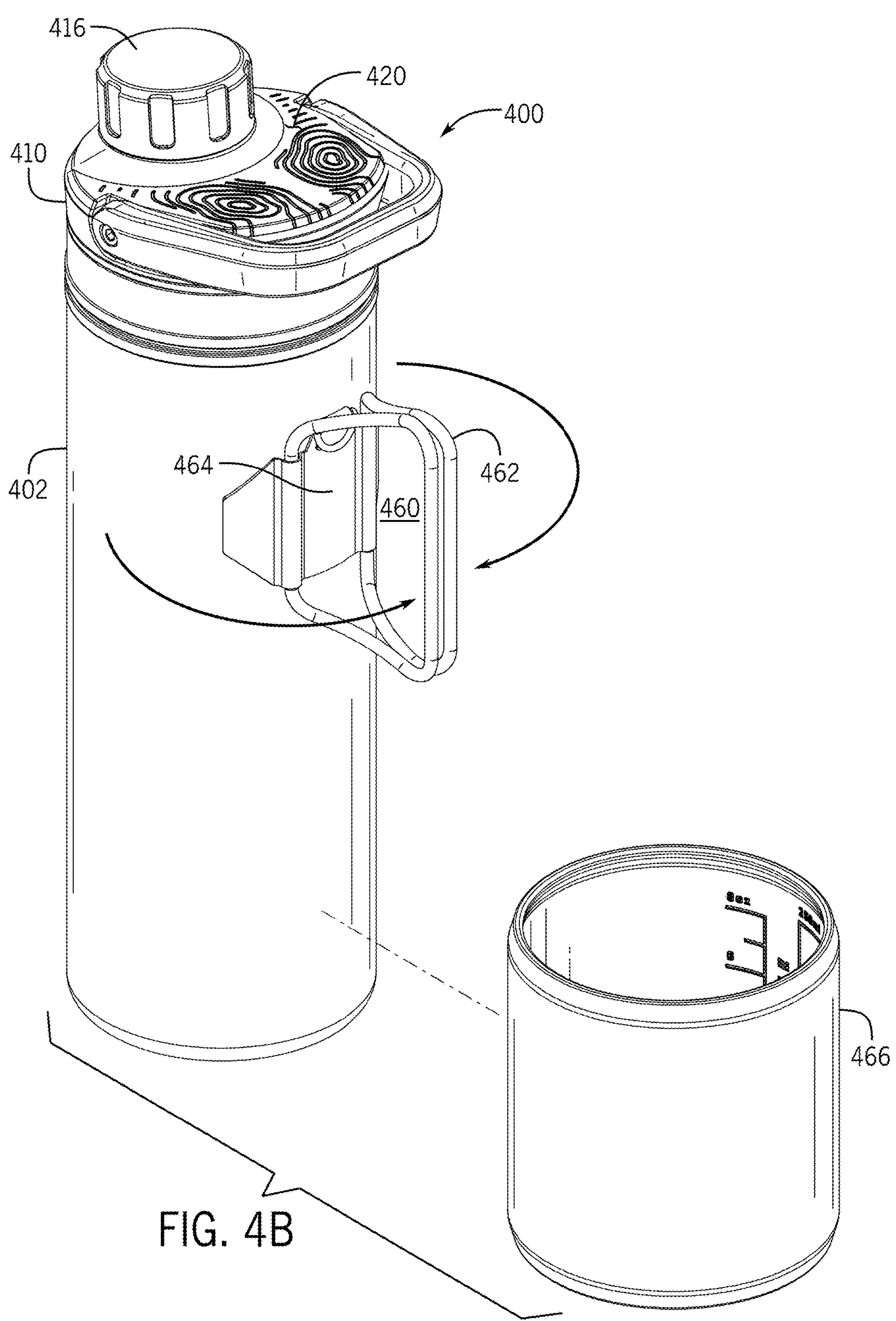
FIG. 4B illustrates another view of the filtration container assembly of FIG. 4A.

Referring to FIGS. 4A and 4B, an alternate embodiment of the filtration container assembly will not be described. Like numerals are used for the embodiment of FIGS. 4A and 4B as used in FIGS. 1A-3D, expect in the 400 series. If the outer container 402 is made of metal or another heat resistive material, it can be used for direct flame heating, for example, when boiling water when camping over a fire or on a camp stove. Movable side handles 460 and 462 (which may be made of metal or another heat resistive material) are coupled to the outer surface of the outer container 402 by an attachment bracket 406. The side handles 460 and 462 are movable between a retracted position (see FIG. 4A) such that they nest adjacent the outer surface of the outer container 402 and an extended position (see FIG. 4B) when in use. The side handles 460 and 462 can be used to move the container 402 when it is hot.

As seen in FIGS. 4A and 4B, the filtration container assemblies 100 may further include a bumper cup 464 which can be made from any suitable material such as plastic or silicon to provide a soft bottom surface to prevent damage to the outer container 402 due to bumping. The bumper cup 464 can be removable for heating the outer container 402. As seen in the illustrated embodiment of FIGS. 4B, the bumper cup 464 may include measuring lines useful, for example, for cooking when outdoors or camping.

Other technical features may be readily apparent to one skilled in the art from the following figures, descriptions, and claims. While illustrative embodiments have been illustrated and described, it will be appreciated that various changes can be made therein without departing from the spirit and scope of the disclosure.

What is claimed is:

1. A container assembly, the container assembly comprising:

an outer container having a first open end and a second closed end and defining an inner cavity; and a plunging assembly having a first end and a second end, wherein the second end of the plunging assembly is configured to be received within the inner cavity of the outer container, wherein the first end of the plunging assembly includes a cap having a pivoting handle, the cap and at least a portion of the handle together defining a first pressing surface configured for a user to press the plunging assembly into the inner cavity of the outer container, wherein the cap defines a cross-sectional area and the first pressing surface defines an area, wherein the area of the first pressing surface is at least 60% of the cross-sectional area of the cap, and wherein the first pressing surface defines a contiguous and substantially planar surface.

2. The container assembly of claim 1, wherein the handle is configured for pivoting movement between a first position and a second position.

3. The container assembly of claim 2, wherein the first position is a retracted position.

4. The container assembly of claim 1, wherein the cap includes a cap body having a first end and a second end defining a cap body height.

5. The container assembly of claim 4, wherein the handle has a handle body defining a holding portion and a first arm and a second arm, each of the first and second arms pivotably coupled to the cap body, and wherein the handle arms each have a first side and a second side defining a handle arm width.

6. The container assembly of claim 5, wherein the handle arm width is less than or equal to the cap body height.

7. The container assembly of claim 6, wherein the cap body includes first and second lip portions disposed between the first and second ends of the cap body, the first and second lip portions configured to support the second side of each of the first and second handle arms when the handle is in the retracted position.

8. The container assembly of claim 7, wherein the first side of each of the first and second handle arms defines a portion of the first pressing surface.

9. The container assembly of claim 8, wherein the holding portion of the handle body has a first side and a second side defining a holding portion width.

10. The container assembly of claim 9, wherein the first side of the holding portion defines a portion of the first pressing surface.

11. The container assembly of claim 1, wherein the first pressing surface allows for a compression force to be applied to the container assembly along a longitudinal axis of the outer container to press the plunging assembly into the inner cavity of the outer container.

12. The container assembly of claim 11, wherein the outer surface of the second closed end of the outer container defines a second pressing surface of the container assembly.

13. The container assembly of claim 12, wherein at least a portion of the second pressing surface is substantially planar.

14. The container assembly of claim 1, wherein the plunging assembly includes an inner sleeve having a first end and a second end and an outer wall defining an inner bore.

15. The container assembly of claim 14, wherein the outer wall is continuous from the first end to the second end of the inner sleeve.

16. The container assembly of claim 14, wherein the plunging assembly includes a filtration assembly having a first end and a second end, wherein the first end of the filtration assembly is at or adjacent the second end of the inner sleeve.

17. The container assembly of claim 16, wherein the first end of the filtration assembly is mechanically coupled to the inner sleeve at or adjacent the second end of the inner sleeve.

18. The container assembly of claim 16, wherein the second end of the filtration assembly is outside the inner bore of the inner sleeve.

19. The container assembly of claim 1, wherein the container assembly further includes a device for releasing pressure from the inner cavity of the outer container when the plunging assembly is received within the inner cavity of the outer container.

20. The container assembly of claim 16, wherein the plunging assembly is configured to filter a liquid contained in the outer container as the plunging assembly is pressed into the inner cavity of the outer container and the liquid moves from the inner cavity of the outer container through the filtration assembly to the inner bore of the inner sleeve of the plunging assembly.

21. The container assembly of claim 1, wherein the cap is removable from the plunging assembly.

22. The container assembly of claim 1, wherein the cap includes an access port to the inner bore of the inner sleeve.

23. The container assembly of claim 1, further comprising retractable handles and/or a bumper cup.

24. A container assembly, the container assembly comprising:

an outer container having a first open end and a second closed end and defining an inner cavity; and a plunging assembly having a first end and a second end, wherein the second end of the plunging assembly is configured to be received within the inner cavity of the outer container, wherein the first end of the plunging assembly includes a cap assembly having a body portion and a handle defining a holding portion, wherein the handle is configured to pivot between a first position and a second position such that, when the handle is in the first position, the first end of the plunging assembly defines a first pressing surface including a portion of the cap and having a first cross-sectional area, and when the handle is in the second position, the first end of the plunging assembly defines a second pressing surface including the portion of the cap and at least a portion of the handle, the second pressing surface having a second cross-sectional area, wherein the holding portion is spaced from the body portion in the second position such that a gap is defined between the holding portion and body portion, and wherein the first cross-sectional area is smaller than the second cross-sectional area.

* * * * *